US010482862B2

(12) United States Patent
Hämäläinen et al.

(10) Patent No.: US 10,482,862 B2
(45) Date of Patent: Nov. 19, 2019

(54) COMPUTER IMPLEMENTED METHOD FOR PROVIDING AUGMENTED REALITY (AR) FUNCTION REGARDING MUSIC TRACK

(71) Applicant: Yousician Oy, Helsinki (FI)

(72) Inventors: Perttu Hämäläinen, Helsinki (FI); Matti Ryynänen, Helsinki (FI)

(73) Assignee: YOUSICIAN OY, Helsinki (FI)

( * ) Notice: Subject to any disclaimer, the term of this patent is extended or adjusted under 35 U.S.C. 154(b) by 218 days.

(21) Appl. No.: 15/597,217

(22) Filed: May 17, 2017

(65) Prior Publication Data

US 2018/0336871 A1    Nov. 22, 2018

(51) Int. Cl.
*G06F 16/58* (2019.01)
*G09B 15/00* (2006.01)
(Continued)

(52) U.S. Cl.
CPC ............ *G10H 1/368* (2013.01); *G06F 3/011* (2013.01); *G06F 3/017* (2013.01); *G06F 3/0304* (2013.01);
(Continued)

(58) Field of Classification Search
CPC .................. G09B 15/00; A63F 13/814; A63F 2300/8047; G10H 1/368; G06F 16/683; G06F 16/58; G06F 3/011; G06F 3/017
See application file for complete search history.

(56) References Cited

U.S. PATENT DOCUMENTS

| 2008/0113698 | A1* | 5/2008 | Egozy | A63F 13/12 |
| | | | | 463/7 |
| 2011/0003638 | A1* | 1/2011 | Lee | G09B 15/00 |
| | | | | 463/35 |

(Continued)

OTHER PUBLICATIONS

Extended European Search Report for European Patent Application No. EP18172614.2, dated Aug. 29, 2018, 13 pages.
(Continued)

*Primary Examiner* — David Duffy
*Assistant Examiner* — Ankit B Doshi
(74) *Attorney, Agent, or Firm* — Ziegler IP Law Group, LLC

(57) ABSTRACT

A computer implemented method for providing an augmented reality (AR) function, comprises receiving input information regarding a music track and an instrument; determining attribute information of the music track based on the received input information; receiving real time content of audiovisual (AV) input signals using at least one capturing device; generating visual information corresponding to visual data of the real time content, wherein the visual information corresponds to a view regarding at least one user limb and an instrument comprising a plurality of user operable elements; generating augmented reality (AR) instruction information based on the attribute information of the music track, the augmented reality (AR) instruction information comprising a plurality of layers; and generating augmented reality (AR) visual information by applying the augmented reality (AR) instruction information to the visual (Continued)

information so that a first layer of the augmented reality (AR) instruction information is applied above at least a portion of the visual information.

20 Claims, 6 Drawing Sheets

(51) Int. Cl.
- *A63F 13/814* (2014.01)
- *G10H 1/36* (2006.01)
- *G06T 15/00* (2011.01)
- *G06F 16/683* (2019.01)
- *G06F 3/01* (2006.01)
- *G06F 3/03* (2006.01)
- *G06T 19/00* (2011.01)
- *G06F 3/0346* (2013.01)

(52) U.S. Cl.
CPC ............ *G06F 3/0346* (2013.01); *G06F 16/58* (2019.01); *G06F 16/683* (2019.01); *G06T 15/005* (2013.01); *G06T 19/006* (2013.01); *G09B 15/003* (2013.01); *G10H 2220/005* (2013.01)

(56) References Cited

U.S. PATENT DOCUMENTS

| | | | |
|---|---|---|---|
| 2015/0141102 A1* | 5/2015 | Asami | A63F 13/45 463/7 |
| 2015/0317910 A1 | 11/2015 | Daniels | |

OTHER PUBLICATIONS

Shiino, Hiroyuki, et al. "Towards an Augmented Reality System for Violin Learning Support", International Workshop on Depth Image Analysis and Applications, Part of the Lecture Notes in Computer Science book series (LNCS, vol. 7854), Nov. 11, 2012, pp. 136-145.

Wang, Zhao, et al. "Fingertips Tracking Algorithm for Guitarist Based on Temporal Grouping and Pattern Analysis", Asian Conference on Computer Vision, ACCV 2016, Part of the Lecture Notes in Computer Science book series (LNCS, vol. 10118), Mar. 16, 2017, pp. 212-226.

Motokawa, et al. "Support System for Guitar Playing using Augmented Reality Display", Published in 2006 IEEE/ACM International Symposium on Mixed and Augmented Reality, Oct. 22, 2006, pp. 243-244.

* cited by examiner

COMPUTER IMPLEMENTED METHOD FOR PROVIDING AUGMENTED REALITY (AR) FUNCTION REGARDING MUSIC TRACK

TECHNICAL FIELD

The present application generally relates to a method, an apparatus and software code for providing a method for providing an augmented reality (AR) function. The present application further relates to a method, an apparatus and software code for providing exercise service for playing a music instrument.

BRIEF DESCRIPTION OF RELATED DEVELOPMENTS

Learning to play a music instrument is common hobby and of interest for many people. However, learning to play the instrument for a beginner is challenging and often requires external teaching assistance.

Typically, when a beginner starts to exercise playing a music instrument it is important to have high motivation. Usually, beginners have high motivation in the beginning, but since repetitive practicing of tone sequences is required and the progress in learning is usually slow, a beginner often loses the inner motivation and stops practicing.

Some methods have been developed to imitate the playing of a music instrument. For example, there is a system that includes a special type guitar, which is played by pressing buttons instead of pressing strings. The system also includes software that is played in a game console. The user can select one of stored songs, after which the system shows on a display instructions for playing, i.e. the buttons to be pressed. Such a system makes playing with a special game guitar entertaining but it does not help much in learning to play a standard type guitar or other music instruments.

A prior known system also exists, where notes of a music piece are shown in a simplified, visual manner on a computer screen. The system also gives the user feedback on whether the playing was correct.

In prior art systems, a learner alternates between looking at a visual reference (book, video, teacher), and at his/her hands and the music instrument. Every gaze shift takes time, and not seeing any visual reference while looking at the music instrument and hands requires one to memorize and retrieve the instructions. This is troublesome.

The prior art systems do not either enhance the motivation of the user to practice exercises. Although the systems give feedback on the user's mistakes the user is only told what the user has done wrong without proposing how to counter the current skill deficiency.

Thus, an easy to set-up, easy to use, and highly functional solution is needed to provide visual guidance to a user for playing a music instrument in a manner that requires minimal shifting of gaze and attention from the user (learner).

Furthermore, a solution is needed to improve collaboration between a user device and music instrument.

SUMMARY

According to a first example aspect of the disclosed embodiments there is provided a computer implemented method for providing an augmented reality (AR) function, comprising:

receiving input information regarding a music track and an instrument;

determining attribute information of the music track based on the received input information, the attribute information comprising data for a user to play the music track with the instrument;

receiving real time content of audiovisual (AV) input signals using at least one capturing device;

generating visual information corresponding to visual data of the real time content, wherein the visual information corresponds to a view regarding at least one user limb and an instrument comprising a plurality of user operable elements;

generating augmented reality (AR) instruction information based on the attribute information of the music track, the augmented reality (AR) instruction information comprising a plurality of layers; and generating augmented reality (AR) visual information by applying the augmented reality (AR) instruction information to the visual information so that a first layer of the augmented reality (AR) instruction information is applied above at least a portion of the visual information.

In an embodiment, the method further comprises:
generating augmented reality (AR) visual information by applying the augmented reality (AR) instruction information to the visual information so that a second layer of the augmented reality (AR) instruction information is applied below at least a portion of the visual information.

In an embodiment, the method further comprises:
receiving instrument selection information;
receiving track selection information; and
determining input information regarding a music track and an instrument based on the instrument selection information and the track selection information.

In an embodiment, the method further comprises:
generating the augmented reality (AR) visual information by mixing the augmented reality (AR) instruction information with the visual information by a mixer application;
encoding the augmented reality (AR) visual information by the mixer application; and
providing the encoded augmented reality (AR) visual information by the mixer application to a user interface of a user device.

In an embodiment, the method further comprises:
determining 3D space information of the instrument based on captured real time content; and
adjusting the augmented reality (AR) instruction information based on the 3D space information so that the augmented reality (AR) instruction information changes according to changes in position or orientation of the instrument.

In an embodiment, the method further comprises:
segmenting the visual information to generate a plurality of data segments within the visual information.

In an embodiment, the plurality of data segments comprises at least a user data segment and an instrument data segment.

In an embodiment, the user data segment comprises information of a user limb used to play the instrument.

In an embodiment, the user data segment comprises information of position or orientation of the user limb.

In an embodiment, the instrument data segment comprises information of a user operable element of the instrument.

In an embodiment, the instrument data segment comprises information of position or orientation of the user operable element.

In an embodiment, the user operable element comprises at least one of the following:

a fret;

a string;

a key; and a button.

In an embodiment, the first layer of the augmented reality (AR) instruction information is applied above the user data segment and the instrument data segment.

In an embodiment, the second layer of the augmented reality (AR) instruction information is applied below the user data segment and above the instrument data segment.

In an embodiment, the second layer of the augmented reality (AR) instruction information is applied below the user data segment and below the instrument data segment.

In an embodiment, the method further comprises:

generating augmented reality (AR) visual information by applying the augmented reality (AR) instruction information to the visual information so that a third layer of the augmented reality (AR) instruction information is applied below the second layer of the augmented reality (AR) instruction information.

In an embodiment, the second layer of the augmented reality (AR) instruction information is applied below a first instrument data segment and above a second instrument data segment, and the third layer of the augmented reality (AR) instruction information is applied below the second instrument data segment.

According to a second example aspect of the disclosed embodiments there is provided an apparatus for providing an augmented reality (AR) function, comprising:

a communication interface;

a user interface;

at least one capturing device;

at least one processor; and at least one memory including computer program code;

the at least one memory and the computer program code configured to, with the at least one processor, cause the apparatus to:

receive input information regarding a music track and an instrument;

determine attribute information of the music track based on the received input information, the attribute information comprising data for a user to play the music track with the instrument;

receive real time content of audiovisual (AV) input signals using at least one capturing device;

generate visual information corresponding to visual data of the real time content, wherein the visual information corresponds to a view regarding at least one user limb and an instrument comprising a plurality of user operable elements;

generate augmented reality (AR) instruction information based on the attribute information of the music track, the augmented reality (AR) instruction information comprising a plurality of layers; and generate augmented reality (AR) visual information by applying the augmented reality (AR) instruction information to the visual information so that a first layer of the augmented reality (AR) instruction information is applied above at least a portion of the visual information.

In an embodiment, the capturing device comprises at least one of the following: a camera directed at the instrument, the instrument, and a microphone.

In an embodiment, the camera is attached to the instrument so that the camera is configured to capture real time content of a view regarding at least one user limb and at least one user operable element of the instrument.

According to a third example aspect of the disclosed embodiments there is provided a computer program embodied on a computer readable non-transitory medium comprising computer executable program code, which when executed by at least one processor of a master device, causes the apparatus to:

receive input information regarding a music track and an instrument;

determine attribute information of the music track based on the received input information, the attribute information comprising data for a user to play the music track with the instrument;

receive real time content of audiovisual (AV) input signals using at least one capturing device;

generate visual information corresponding to visual data of the real time content, wherein the visual information corresponds to a view regarding at least one user limb and an instrument comprising a plurality of user operable elements;

generate augmented reality (AR) instruction information based on the attribute information of the music track, the augmented reality (AR) instruction information comprising a plurality of layers; and generate augmented reality (AR) visual information by applying the augmented reality (AR) instruction information to the visual information so that a first layer of the augmented reality (AR) instruction information is applied above at least a portion of the visual information.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1A:
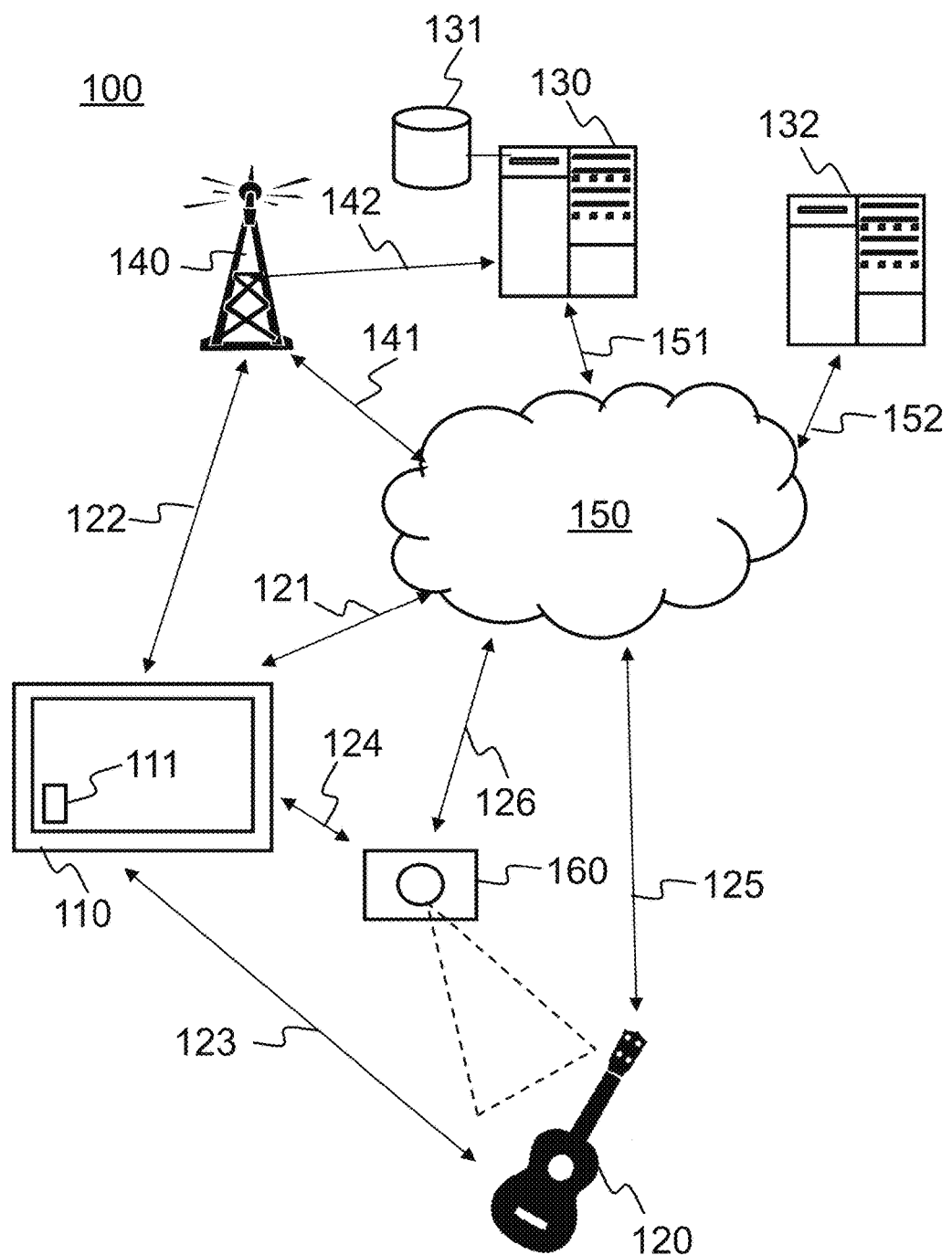
FIG. 1a shows a schematic picture of a system according to an aspect of the disclosed embodiments.

FIG. 1 a shows a schematic picture of a system 100 according to an example embodiment. A user device 110 may comprise a portable terminal comprising a communication interface, for example. The user device 110 is capable of downloading and locally executing software program code. The software program code may be a client application 111 of a service whose possible server application is running on a server apparatus 130, 132 of the system 100. The user device 110 may comprise a camera and/or microphone for providing real time AV signals. The camera may also be used to provide video stream for a multimedia connection and a microphone may be used for providing audio stream for the multimedia connection, for example. The user device 110 is configured to be connectable to a public network 150, such as Internet, directly via local connection 121 or via a wireless communication network 140 over a wireless connection 122. The wireless connection 122 may comprise a mobile cellular network or a wireless local area network (WLAN), for example. The wireless communication network 140 may be connected to a public data communication network 150, for example the Internet, over a data connection 141. The user device 110 is configured to be connectable to the public data communication network 150, for example the Internet, directly over a data connection 121 that may comprise a fixed or wireless mobile broadband access. The wireless communication network 140 may be connected to a server apparatus 130 of the system 100, over a data connection 142.

In an embodiment, a user device 110 may be used for providing an augmented reality (AR) function, comprising a communication interface; a user interface; connection 124 to at least one capturing device 160; at least one processor; and at least one memory including computer program code; the at least one memory and the computer program code 111 configured to, with the at least one processor, cause the user device 110 to:

receive input information regarding a music track and an instrument;

determine attribute information of the music track based on the received input information, the attribute information comprising data for a user to play the music track with the instrument, such as musical notation data, for example;

receive real time content of audiovisual (AV) input signals using at least one capturing device 120, 160 over a local connection 123, 124;

generate visual information corresponding to visual data of the real time content, wherein the visual information corresponds to a view regarding at least one user limb and an instrument 120 comprising a plurality of user operable elements;

generate augmented reality (AR) instruction information based on the attribute information of the music track, the augmented reality (AR) instruction information comprising a plurality of layers; and generate augmented reality (AR) visual information by applying the augmented reality (AR) instruction information to the visual information so that a first layer of the augmented reality (AR) instruction information is applied above at least a portion of the visual information.

In an embodiment, a second layer of the augmented reality (AR) instruction information is applied below at least a portion of the visual information.

In an embodiment, applying the augmented reality (AR) instruction information to the visual information so that something is applied above at least a portion of the visual information and something is applied below at least a portion of the visual information may correspond to a situation, where visual information from a camera may at least partly occlude the instruction visuals (for example guitar strings from the camera image can appear on top of the instruction visuals (and therefore occlude part of the instruction visuals)).

In an embodiment, a user device 110 (mobile phone, tablet, smart television or computer) sets up local connections 123, 124 with at least one of the capturing device 160 and the instrument 120 to collaborate in a real time content capturing and augmented reality (AR) generation session.

The user device 110 comprises a client application 111 and the capturing device 160 and/or the instrument 120 may just accept an invite (sent via a communication link locally or remotely over network 150) to join a session, for example.

The user device 110 client application 111 may allow the user device 110 to log into a music exercise service run on a server 130,132 for example. The user device 110 may send invitation for collaboration to contacts maintained within the user device 110.

Then again, a capturing device 160 may capture and send a real time stream video to the user device 110 over a peer-to-peer connection formed over a WiFi, mobile or other network, for example.

The user device 110 may be connected to a plurality of different capturing devices 160 and instruments 120 and the user device 110 may be configured to select which devices 120, 160 is actively collaborated with. For example, a user of the device 110 may control which stream (or streams) received from the devices 120, 160 is received by the user device 110. The user of the user device 110 may choose one of the streams that the device 110 may decode and process for providing the augmented reality (AR) function.

The master device 120 broadcasts the chosen AV stream directly to the Internet 150, for example to a live video service (e.g. Facebook Live, YouTube, or Periscope, run on any of the servers 130,132 for example.

The user device 110 may need to be logged in with user credentials to a chosen service of the network server 130, 132.

In an embodiment, AV streams may be sent via a peer-to-peer connections 123, 124 from wireless device(s) 120, 160 to the user device 110 (not via cloud server), or over mobile network or WiFi 122, 140. The connections 122, 123, 124 may be wireless or wired.

The user device 110 may show all incoming real time AV streams on device 110 screen and user device 110 user may choose any available stream by e.g. clicking on it and utilizing the selected content.

In an embodiment, the system 100 comprises an instrument 120 configured to be connectable to the user device 110 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise acoustic connection, Bluetooth™, Radio Frequency Identification (RF-ID) or wireless local area network (WLAN), for example. Near field communication (NFC) may be used for device identification between the instrument 120 and the user device 110, for example. The instrument 120 may comprise a guitar, a vocal (human voice), a piano, an ukulele, a bass, a saxophone or a trumpet, for example. The instrument 120 may also be connected directly to the public network 150, such as Internet, via direct local connection 125 or via a wireless cellular network connection 140, 141.

In an embodiment, the system 100 comprises a capturing device 160 configured to be connectable to the user device 110 over a local connection 124. The local connection 124 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the capturing device 160 and the user device 110, for example. The capturing device 160 may comprise a camera, a microphone, or a combination of a camera and a microphone, for example. The capturing device 160 may also be connected directly to the public network 150, such as Internet, via direct local connection 126 or via a wireless cellular network connection 140, 141.

In an embodiment, the system 100 may comprise a server apparatus 130, which comprises a storage device 131 for storing service data, service metrics and subscriber information, over data connection 151. The service data may comprise configuration data, account creation data, augmented reality (AR) data, track data, instrument data, and attribute data, for example.

In an embodiment, a proprietary application in the user device 110 may be a client application 111 of a service whose server application is running on the server apparatus 130 of the system 100.

Figure 5:
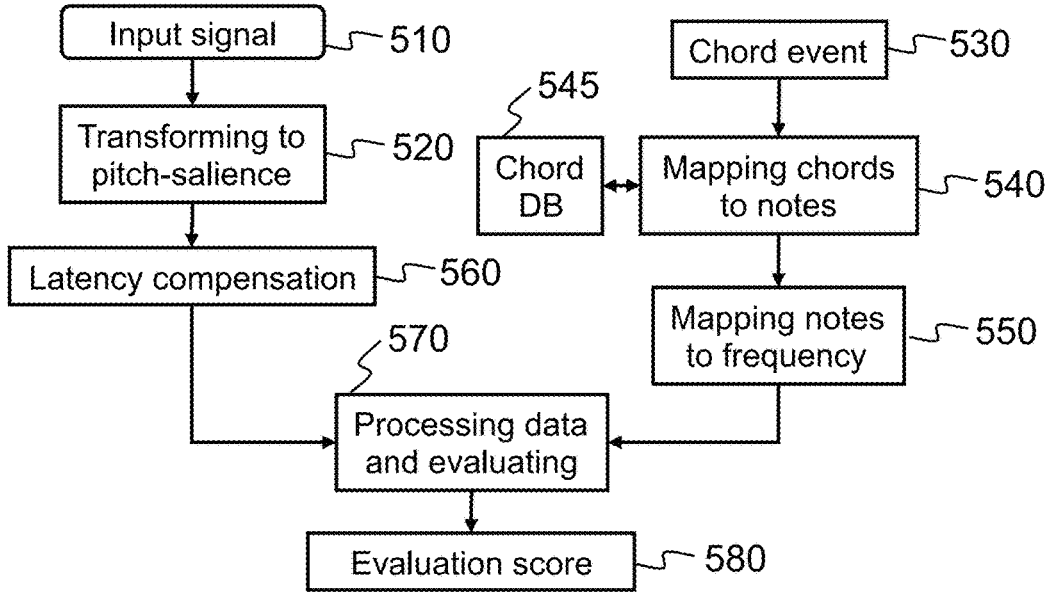
FIG. 5 shows a flow diagram showing operations in accordance with an example embodiment.
Figure 6:
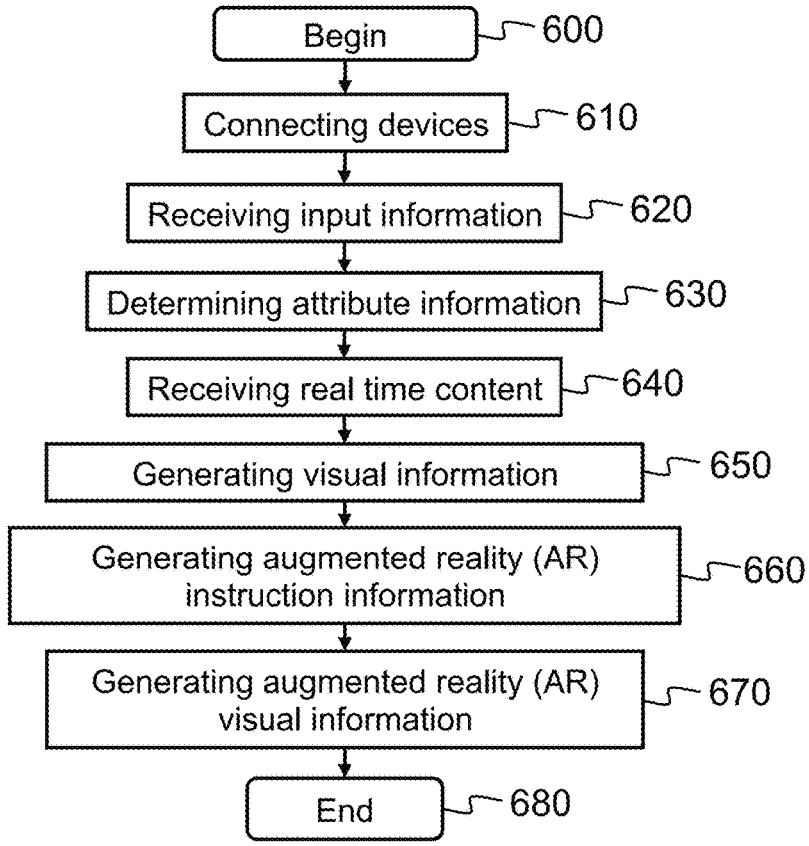
FIG. 6 shows a flow diagram showing operations in accordance with an aspect of the disclosed embodiments.

For a user device 110, the client application 111 may comprise a simple webapp/website (or Android/IOS Native app, for example) configured to provide functionalities illustrated relating to FIGS. 5-7, for example.

The proprietary application of the user device 110 may receive user input data for the AR service and provide the user output data. The user input data may comprise real time visual content captured by the capturing device 160, such as a camera. The user input data may also comprise real time audio content captured by the capturing device 160, such as a camera or a microphone. The microphone may be located in at least one of the capturing device 160, the instrument 120 or the user device 110, for example. Content may be transceived over local connections 123, 124, as shown. The local connection 123 may comprise an acoustic connection.

In an embodiment, configuration information or application download information for any of the user device 110, the capturing device 160, the instrument 120 and the system server 130 may be automatically downloaded and configured by the server 130. Thus the user of the devices 110, 120, 160 may not need to do any initialization or configuration for the service. The system server 130 may also take care of account creation process for the service, such as real time AV service between the user device 110 and the capturing device 160.

In an embodiment, the user device 110 and at least one of the capturing device 160 and the instrument 120 may be associated using one of many different methods, such as by entering a unique user ID or email address, by entering a unique token (which can be text or e.g. a QR code) or using, for example, some external service, such as Google's Nearby API which is a publish-subscribe API that lets you pass small binary payloads between internet-connected Android and iOS devices. Such devices do not have to be on the same local network, but they do have to be connected to the Internet 150. Nearby uses a combination of e.g. Bluetooth, Bluetooth Low Energy, Wi-Fi and near-ultrasonic audio to communicate a unique-in-time pairing code between devices. The server 130 may facilitate message exchange between devices 110, 120, 160 that detect the same pairing code. When a device detects a pairing code from a nearby device, it sends the pairing code to the Nearby Messages server 130 for validation, and to check whether there are any messages to deliver for the application's current set of subscriptions.

In an embodiment, the association of the devices 110, 120, 160 can be one-time or stored persistently on any of the devices 110, 120, 160 or the server 130, 131.

In an embodiment, for the purposes of an augmented reality (AR) function for instrument playing exercise, before establishing the real time content transceiving between the different devices, all devices participating in the function must be made aware of how they are associated so that each device gets the correct streams and data for further processing.

In an embodiment, the peer connection 124 between the capturing device 160 and the user device 110 can be two-way (even though captured AV content only goes from capturing device 160 to user device 110) because e.g. control commands or other messaging could be going in the other direction from user device 110 to the capturing device 160 over the peer connection.

In an embodiment, the real time session over connection 124 may comprise a real time WebRTC session or other similar live session.

In an embodiment, real time content captured by the capturing device 160 may comprise mixed content of both audio and video, for example.

In an embodiment, a system may comprise a master device 110, at least one slave device 120, 160 and a service server 130, 132. The (e.g. wireless) slave(s) 120, 160 may capture AV content and send the AV content to the master device 110. However, the slave(s) 120, 160 can also send the AV content to the streaming service directly and the master device 110 may send selection information to the streaming service 130, 132 to decide which slave output is received at a time. Such approach can be alternative for the master device 110 option.

Figure 1B:
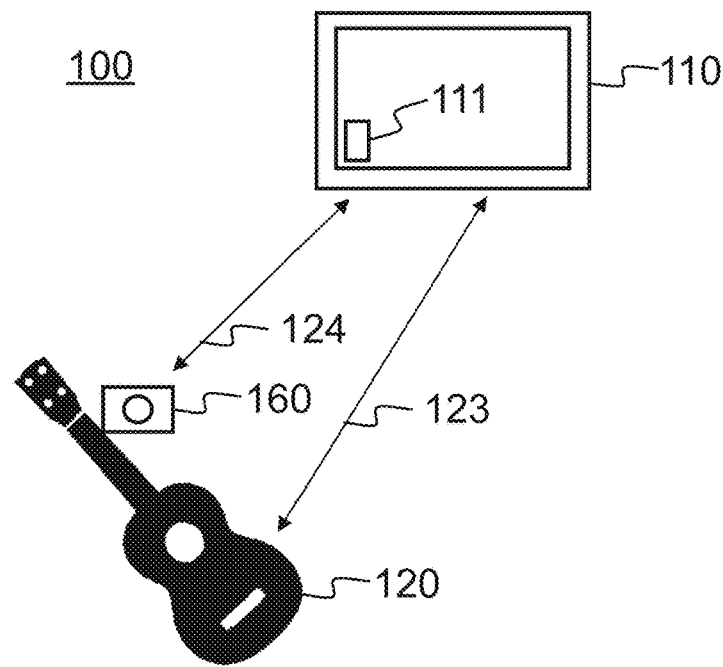
FIG. 1b shows another schematic picture of a system according to an aspect of the disclosed embodiments.

FIG. 1b shows another schematic picture of a system 100 according to an example embodiment for selected parts of the system 100.

In an embodiment, a user device 110 is configured to use the user device 110, such as a smart phone, a tablet, or a computer for both capturing video and audio relating to the instrument 120 played by the user.

In an embodiment, a user device 110 is configured to use a capturing device 160, such as a camera device for both capturing video and audio relating to the instrument 120 played by the user.

In an embodiment, a user device 110 is configured to use a capturing device 160, such as a camera device for capturing video, and configured to use a microphone of the user device 110 for capturing audio relating to the instrument 120 played by the user.

In an embodiment, a user device 110 is configured to use a capturing device 160, such as a camera device for capturing video, and configured to use an audio input of the user device 110 for receiving audio captured by a microphone of the instrument 120 played by the user.

In an embodiment, a user has a client application 111 ("Music playing exercise app") installed in the user device 110. Optionally, corresponding client application(s) may be installed on a capturing device 160 and the instrument 120 that can pair devices with the client application 111 to enable association of the devices 110, 120, 160 and to further provide AR function service.

In an embodiment, the user device 110 and the capturing device 160 or the instrument 120 do not have to be connected locally for pairing. The user device 110 and the external devices 120, 160 can be paired also so that the user device 110 is connected to a mobile network over connection 121 and therefrom to the Internet 150 for example, and the externals devices 120, 160 are connected over local connections 125, 126 to a local WLAN network 140 or directly to the Internet 150 and eventually to the user device 100 for pairing, for example, even via the server 130.

In an embodiment, a camera 160 (imaging device) is directed at a musical instrument 120 played by a user. A computer implemented method of the client application 111 provides an augmented reality (AR) function for providing playing instructions for the instrument 120 on a screen of the user device 110, composited together with a camera view generated by the camera 160.

In an embodiment, visual instructions are provided in multiple layers, not only to overlay graphics on top of the camera view. More specifically, the embodiments may comprise at least some of the following steps:

1) 3D position and orientation of parts of interest of the musical instrument relative to the camera are determined. This may involve detection and determination of the instrument 120 and at least one of a plurality of user operable elements of the instrument 120, such as keys, strings or buttons, for example.
2) A camera view information is captured by the camera 160 and transmitted to the user device 110 over the local connection 124
3) The camera view information is segmented into parts, such as user segments and instruments segments, by the user device 110. The user segments may comprise fingers or other limbs of the user, their position and orientation, for example. The instrument segments may comprise fretboard, strings, and buttons, their position and orientation, for example.
4) Multiple types of visual instructions are generated and provided via the user interface of the user device 110, according to the determined 3D position and orientation of steps 1-3, with varying drawing order, i.e., graphics may appear in front of some segments and behind others in different layers. For example, in guitar instructions, some graphics are rendered on top of user fingers, and others are rendered on the fretboard under the fingers, for example.

In an embodiment, the segmentation may be generated based on detected color information. Furthermore, at least one of the following options may be used for segmentation:

A) A pixelwise decision forest classifier.
B) A deep artificial neural network application 111 running on the user device 110 that takes the unsegmented image/video from a capturing device 160 as an input data and generates a pixelwise labeled image as an output. A convolutional encoder-decoder network with skip-connections may be used. This may be useful approach, especially as a very deep network is not needed as the segmentation task is rather simple and only needs local knowledge (the receptive fields of the top-level encoder neurons only need to be the size of maybe one finger bone, for example).
C) Distance-based segmentation using a depth camera 160. The depth resolution of depth sensors (e.g. Kinect V2) of the capturing device 160 can be used for millimeter precision needed for the music instrument visuals.

In an embodiment, a graphic ball, a predictive trajectory, and predictive fretboard markers may be used.

In an embodiment, the camera 160 is mounted on the musical instrument 120 instead of using a camera integrated to the user device 110, or a camera mounted on a table or an AR helmet, for example.

In an embodiment, augmented reality (AR) instruction information may be generated based on attribute information of the music track (see e.g. steps 530-550 of FIG. 5), wherein the augmented reality (AR) instruction information comprises a plurality of layers. Furthermore, augmented reality (AR) visual information is generated by applying the augmented reality (AR) instruction information to the visual information so that a first layer of the augmented reality (AR) instruction information is applied above at least a portion of the visual information. A second layer of the augmented reality (AR) instruction information may further be applied below at least a portion of the visual information.

In an embodiment, the augmented reality (AR) instruction information may comprise a flying item (e.g. a graphic ball) that bounces off a fretboard of a guitar (in case of guitar selected as the instrument) at positions where the user has to press certain string according to the attributes of the track.

In an embodiment, the augmented reality (AR) instruction information may comprise predictive trajectory visualization. Such augmented reality (AR) instruction information allows the user to anticipate the future movement of the flying item (e.g. the graphic ball, see above) and helps in coordination and planning of instrument playing movements. The trajectory may be further characterized in that it becomes more transparent in more distant future. If the trajectory is drawn fully opaque up to a planning horizon, the movement of the trajectory's end may steal the player's attention and may make playing the instrument more difficult. Such setting may be defined in user defined settings for different levels of the training system, for example.

In an embodiment, the augmented reality (AR) instruction information may comprise predictive markers on the user operable elements of the instrument 120 (e.g. a fretboard of a guitar or bass) that appear at a specific time interval before a specific element (e.g. string and fret) is to be played. Such information may further help the player to anticipate the playing movements.

In an embodiment, authentication of a user device 110 on a system server 130 may utilize hardware or SIM credentials, such as International Mobile Equipment Identity (IMEI) or International Mobile Subscriber Identity (IMSI). The user device 110 may transmit authentication information comprising IMEI and/or IMSI, for example, to the system server 130. The system server 130 authenticates the user device 110 by comparing the received authentication information to authentication information of registered users stored at the system server database 131, for example. Such authentication information may be used for pairing the devices 110, 120, 160 to generate association between them for a AR session connection.

In an embodiment, a peer-to-peer multimedia connection may be enabled by one of a multitude of client applications 111 that are components of a user device 110 application. Third party account credentials (usernames, passwords, etc.) may be hosted by the system server 130 and utilized when needed for AR function for exercising of playing a music instrument 120, for example.

In an embodiment, a service web application may be used for configuration of a system. The service web application may be run on any user device 110, admin device, or a remote control apparatus, such as a personal computer connected to a public data network, such as Internet 150, for example. The control apparatus may also be connected locally to the user device 110 over a local connection and utilize the network connections of the user device 110 for configuration purposes. The service web application of the control apparatus may provide searching/adding instruments, determining attributes for tracks, personalizing screen names, personalizing visual instructions, device setup and configuration such as Wi-Fi Setup and user device 110 configurations, for example. The service web application of the control apparatus may be a general configuration tool for tasks being too complex to be performed on the user interface of the user device 120, for example.

In an embodiment, a remote control apparatus may be authenticated and configuration data sent from the control apparatus to the system server 130, 131 wherein configuration settings for the user device 110 are modified based on the received data. In an embodiment, the modified settings may then be sent to the user device 110 over the network 150 and the local connection or the wireless operator. The modified settings may also be sent to external devices 120, 160 correspondingly, through the user device 110, or directly over the network 150, for example.

In an embodiment, the user device 110, the instrument 120 and a capturing device 160 may be wireless or wired.

In an embodiment, a camera 160 is mounted on the body of an instrument 120, such as a guitar. The composited instructions, comprising the bouncing ball, predictive trajectory, and predictive fretboard markers, may be generated.

In an embodiment, correct hand pose information may be visualized so that the user can match it. For example, visualized bone lengths may be estimated from user's hand and provided using computer vision.

In an embodiment, correct hand pose is visualized so that the user can match it. The visualized lengths may be estimated from user's hand and provided using computer vision.

In an embodiment, timelines of notes to be played by the user for each fret position may be augmented using AR on the instrument 120, such as a guitar.

In an embodiment, timelines of notes for each string and fret position augmented on the guitar may be provided for the user on the UI of the user device 110. Strings and frets with no upcoming notes may be hidden to reduce clutter, for example.

In an embodiment, linear per fret and string timelines may be combined with the bouncing ball graphics. The goal for the user may be to hit the linearly moving notes when they collide with the bouncing ball.

Figure 2:
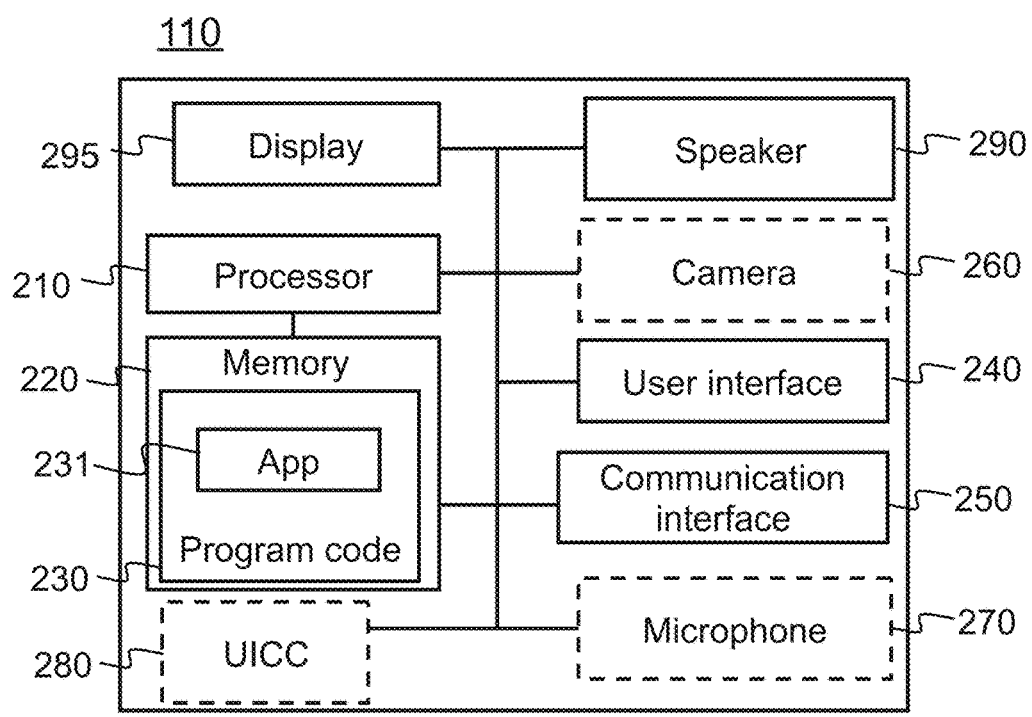
FIG. 2 presents an example block diagram of a user device.

FIG. 2 presents an example block diagram of a user device 110, in which various aspects of the disclosed embodiments may be applied. The user device 110 may be a user equipment (UE), user device or apparatus, such as a mobile terminal, a smart phone, a smart TV, a phablet, a tablet, or other communication device comprising a communication interface and a user interface.

The general structure of the user device 110 comprises a user input device 240, a communication interface 250, a microphone 270, a camera 260, a processor 210, and a memory 220 coupled to the processor 210. The user device 110 further comprises software 230 stored in the memory 220 and operable to be loaded into and executed in the processor 210. The software 230 may comprise one or more software modules, such as a music instrument training module 231 that may comprise a mixer application for receiving input information regarding a music track and an instrument; determining attribute information of the music track based on the received input information; receiving real time content of audiovisual (AV) input signals using at least one capturing device; generating visual information corresponding to visual data of the real time content, wherein the visual information corresponds to a view regarding at least one user limb and an instrument comprising a plurality of user operable elements; generating augmented reality (AR) instruction information based on the attribute information of the music track, the augmented reality (AR) instruction information comprising a plurality of layers; and generating augmented reality (AR) visual information by applying the augmented reality (AR) instruction information to the visual information so that a first layer of the augmented reality (AR) instruction information is applied above at least a portion of the visual information. A second layer of the augmented reality (AR) instruction information may further be applied below at least a portion of the visual information. The music instrument training module 231 can be in the form of a computer program product. The user device 110 may further comprise a universal integrated circuit card (UICC) 280.

In an embodiment, the user device 110 may comprise a display 295 for presenting information to a user of the device 110. In case the user device 110 does not comprise the display 295, an external AN apparatus may be used for presenting information.

The processor 210 may be, e.g., a central processing unit (CPU), a microprocessor, a digital signal processor (DSP), a graphics processing unit, or the like. FIG. 2 shows one processor 210, but the user device 110 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user device 110 may comprise a plurality of memories. The memory 220 may be constructed as a part of the user device 110 or it may be inserted into a slot, port, or the like of the user device 110 by a user. The memory 220 may serve the sole purpose of storing data, or it may be constructed as a part of an apparatus serving other purposes, such as processing data. Client application data for different services provided by service providers may be stored and run in the memory 220 as well as other user device 110 application data. A client application 111 is one such software application run by the processor with the memory.

The user input device 240 may comprise circuitry for receiving input from a user of the user device 110, e.g., via a keyboard, a touch-screen of the user device 110, speech recognition circuitry, gesture recognition circuitry or an accessory device, such as a headset or a remote controller, for example.

The camera 260 may be a still image camera or a video stream camera, capable for creating multimedia data for AR function service. The device 110 may comprise several cameras, for example a front camera and a rear camera, or an internal camera and an external camera. The user of the device 110 may select the used camera 260 via settings of the device 110 or the client application within the device 110.

In an embodiment, the user device 110 may comprise several cameras 260, the user device 110 may be connected to several cameras 160 (see FIG. 1a-b) and/or several user devices 110 each comprising a camera 260 to provide 3D image/video capturing.

Human vision is binocular (stereoscopic): we have two sensors, our two eyes, and because they are horizontally separated we receive two images of the same scene with slightly different viewpoints. The brain superimposes and interprets the images to create a sensation of depth or three-dimensional vision.

In an embodiment, two parallel cameras 260 of a user device 110 or of at least one capturing device 160 (see FIG. 1a-b) are used to simultaneously capture scenes. When the images or video signal are shown by a user device 110, the image recorded with the left camera is viewed only by the left eye, while the one recorded with the right camera is captured only by the right eye, for example. The reconstruction of images in three dimensions does bring something new because it allows the viewpoint to be freely selected after images/video streams have been recorded. Thus, VR (Virtual Reality) headset may be used instead of the display 295.

In an embodiment, at least two user devices 110 each comprising or connected with a camera 260 may be used for capturing 3D image/video signal. Both user devices 110 may be paired with the associated capturing devices 160 separately and transmitting encoded audio and video signals to at least one of the user devices 160 regarded as master device that receives and compiles the signals to generate 3D image/video signal. Alternatively a second user device 110 or a second capturing device 160 is connected over local connection to a first user device 110 to provide second camera signal and the first user device 110 or the first capturing device 160 captures first camera signal and generates from the first and the second camera signal a combined image or video signal with 3D effect.

The speaker 290 is configured to notify a user of and to provide other user alarm sounds. The speaker 290 also allows the user hear the track to be played with the instrument 120.

The microphone 270 is configured to capture audio stream of the user playing the instrument 120, for example.

In an embodiment, the microphone 270 may be used to disable the speaker 290 when identical audio output is detected, using the microphone 270, from an external source, such as the capturing device 160. The device speaker 290 may only be required when the capturing device 160 microphone is switched off or operating at very low volumes. The identical audio output may be detected based on audio data comparison and based on distance calculation the audio data source may be determined to be the user device 110 instead of the instrument 120 and the speaker 290 may be switched off automatically.

In an embodiment, the universal integrated circuit card (UICC) 280 is the smart card used in mobile terminals in GSM, UMTS or 5G networks. The UICC 280 ensures the integrity and security of all kinds of personal data, and it typically holds a few hundred kilobytes. In a GSM network, the UICC 280 contains a SIM application and in a UMTS network the UICC 280 contains a USIM application, for example. The UICC 280 may contain several applications, making it possible for the same smart card to give access to both GSM and UMTS/5G networks, and also provide storage of a phone book and other applications. It is also possible to access a GSM network using a USIM application and it is possible to access UMTS/5G networks using a SIM application with mobile terminals prepared for this.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, LTE (Long Term Evolution) or 5G radio module. The wired interface may comprise such as universal serial bus (USB), HDMI, SCART or RCA, for example. The communication interface module 250 may be integrated into the user device 110, or into an adapter, card or the like that may be inserted into a suitable slot or port of the user device 110. The communication interface module 250 may support one radio interface technology or a plurality of technologies. The communication interface module 250 may support one wired interface technology or a plurality of technologies. The user device 110 may comprise a plurality of communication interface modules 250.

A skilled person appreciates that in addition to the elements shown in FIG. 2, the user device 110 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user device 110 may comprise a disposable or rechargeable battery (not shown) for powering when external power if external power supply is not available.

In an embodiment, the user device 110 comprises speech or gesture recognition means. Using these means, a predefined phrase or a gesture may be recognized from the speech or the gesture and translated into control information for the user device 110, for example.

Figure 3:
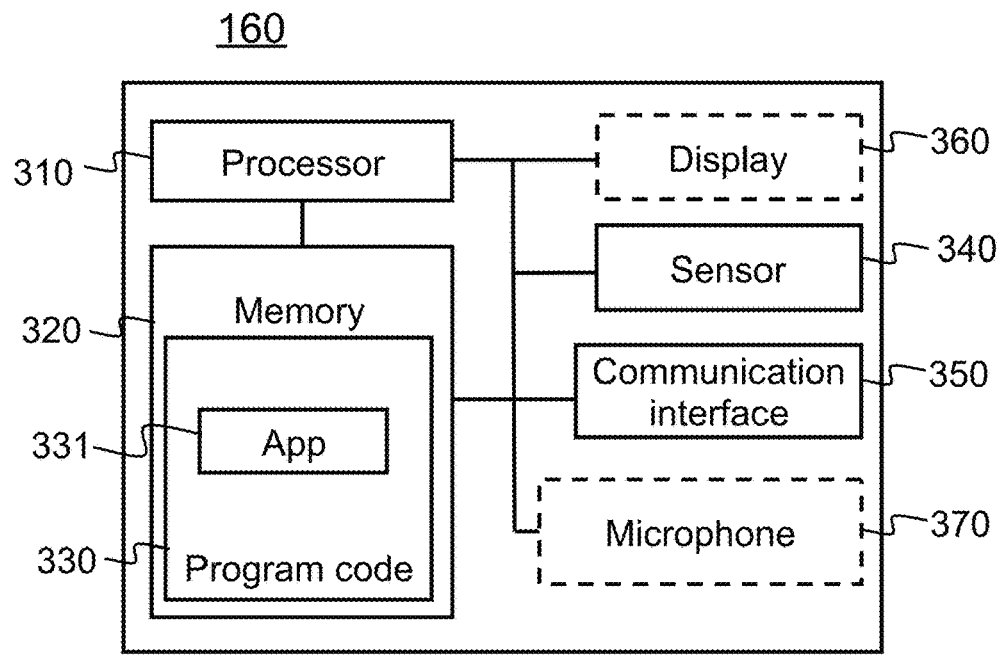
FIG. 3 presents an example block diagram of a capturing device.

FIG. 3 presents an example block diagram of capturing device 160 in which various aspects of the disclosed embodiments may be applied. The capturing device 160 may be a camera device comprising a communication interface.

The general structure of the capturing device 160 comprises a communication interface 350, a processor 310, and a memory 320 coupled to the processor 310. The capturing device 160 further comprises software 330 stored in the memory 320 and operable to be loaded into and executed in the processor 310. The software 330 may comprise one or more software modules, such as music instrument capturing module 331 that may be comprised by a client application for AR function service, and can be in the form of a computer program product.

The capturing device 160 may further comprise a display 360 and a microphone but they are optional and not necessarily required.

The processor 310 may be, e.g., a central processing unit (CPU), a microprocessor, a digital signal processor (DSP), a graphics processing unit (GPU), or the like. FIG. 3 shows one processor 310, but the capturing device 160 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The capturing device 160 may comprise a plurality of memories. The memory 320 may be constructed as a part of the capturing device 160 or it may be inserted into a slot, port, or the like of the capturing device 160 by a user. The memory 320 may serve the sole purpose of storing data, or it may be constructed as a part of an apparatus serving other purposes, such as processing data.

The sensor 340 may comprise an imaging sensor used for still image or video stream capturing.

In an embodiment, the capturing device 160 may further comprise loudspeaker or multiple loudspeakers with wired or wireless connections. Furthermore, the speaker(s) may comprise a jack for headphones and the headphones.

The display 360 may comprise a LED screen, a LCD screen or a plasma screen, with touch sensitive features or without, for example.

The communication interface module 350 implements at least part of data transmission. The communication interface module 350 may comprise, e.g., a wireless or a wired interface module. The wireless interface may comprise such as a WLAN, Bluetooth, infrared (IR) or radio frequency identification (RF ID) radio module. The wired interface may comprise such as universal serial bus (USB), HDMI, SCART or RCA, for example. The communication interface module 350 may be integrated into the capturing device 160, or into an adapter, card or the like that may be inserted into a suitable slot or port of the capturing device 160. The communication interface module 350 may support one radio interface technology or a plurality of technologies. The capturing device 160 may comprise a plurality of communication interface modules 350.

A skilled person appreciates that in addition to the elements shown in FIG. 3, the capturing device 160 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the capturing device 160 may comprise a disposable or rechargeable battery (not shown) for powering when external power if external power supply is not available.

Figure 4:
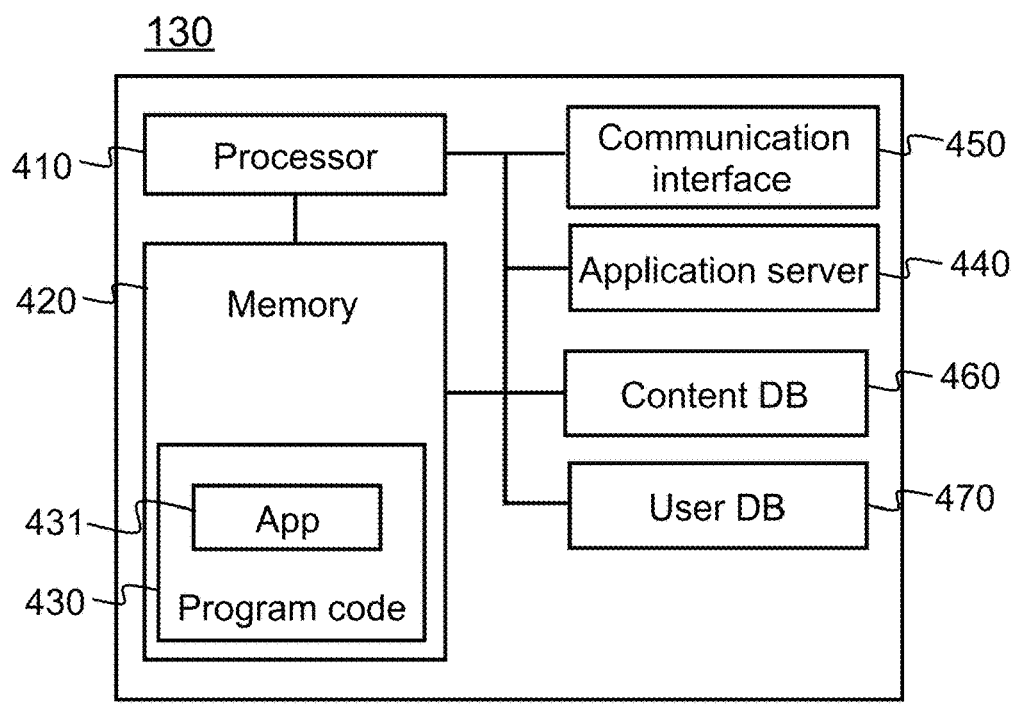
FIG. 4 presents an example block diagram of a system server.

FIG. 4 presents an example block diagram of a system server 130 in which various aspects of the disclosed embodiments may be applied.

The general structure of the system server 130 comprises a processor 410, and a memory 420 coupled to the processor 410. The server 130 further comprises software 430 stored in the memory 420 and operable to be loaded into and executed in the processor 410. The software 430 may comprise one or more software modules such as music instrument training module 431 that may be used for augmented reality (AR) function service and can be in the form of a computer program product.

The processor 410 may be, e.g., a central processing unit (CPU), a microprocessor, a digital signal processor (DSP), a graphics processing unit, or the like. FIG. 4 shows one processor 410, but the server 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The system server 130 may comprise a plurality of memories. The memory 420 may be constructed as a part of the system server 130 or it may be inserted into a slot, port, or the like of the system server 130. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface module 450 may be integrated into the server 130, or into an adapter, card or the like that may be inserted into a suitable slot or port of the system server 130. The communication interface module 450 may support one radio interface technology or a plurality of technologies.

Configuration information between the user device 110 and the system server 130 may be transceived using the communication interface 450. Similarly, account creation information between the system server 130 and a service provider may be transceived using the communication interface 450.

An application server 440 provides application services e.g. relating to the user accounts stored in a user database 470 and to the service information stored in a service database 460. The service information may comprise content information, music track information, visual information, attribute information, content management information or metrics information, for example.

A skilled person appreciates that in addition to the elements shown in FIG. 4, the system server 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

In an embodiment, a user provides selection information via user interface 240 of the user device 110, and the selection information is configured to control which music track and instrument is to be used. Furthermore, the user input may define whether video input signals and audio input signals captured by a user device 110 or by a capturing device 160 is to be used.

FIG. 5 shows a functional diagram of an exemplary method for analyzing playing of a user in connection with an example embodiment for providing an augmented reality (AR) function.

The system receives a signal input 510 from a microphone or some other input, such as a camera. The signal is then converted 520 into parameter data. This data shows e.g. information on the frequency components of the signal and their amplitudes, i.e. pitch and salience, and it may also include information on timing, volume, duration, style of playing (like staccato) or up vs. down strumming in guitar. Further, parameter data may include melody, harmony, rhythm, tempo, meter, articulation, dynamics and the sonic qualities of timbre and texture. While the signal may include such many different types of parameters, FIG. 5 illustrates an example where signal frequency is a parameter. However, the other types of parameters, such as ones listed above, can naturally be processed in a corresponding manner.

The input signal 510 may also be a digital signal received from the music instrument, e.g. from a MIDI interface of the instrument. In such a case the required signal parameters can be achieved from the digital signal directly or with digital processing.

Note/interval/chord events are received from the exercise data 530. The interval and chord data is mapped into notes 540, based on conversion information on a database 545. The notes are further mapped into frequencies 550. Before the evaluation 570 the latency of the signals is compensated 560. The system uses the information on which are the correct frequency components and sums weighed amplitude values of these frequency components of the played signal 570. The result is scaled and a point score is achieved 580.

It is possible that the exercise data includes other parameters in addition to frequency and amplitude values of frequency components i.e. pitch and salience, such as timing, duration, volume or style of playing, melody, harmony, rhythm, tempo, meter, articulation, dynamics and the sonic qualities of timbre and texture. Such parameters can then also be compared to the audio signal parameters of playing and achieve further characteristics of the playing. If the exercise data in the form of MIDI exercise files, the file may contains basic note information (note on and note off messages) that can be mapped into frequencies. A MIDI exercise file may also include also other exercise parameters such as timing of notes, intervals, and/or chords as well as other parameters described above.

The described analysis method allows analyzing intervals and chords, i.e. several simultaneous notes. However, other alternative analysis methods may also be used such as pattern matching method, for example.

The techniques for recognizing notes from an acoustic signal can be self learning based on collected audio data. Such audio data can be specifically provided to the system, but such data can also be collected from the playing of the users. The acoustic data recorded from the users as well as other collected data can be thus used for optimizing the system and for detecting error situations.

FIG. 6 shows a flow diagram showing operations in accordance with an example embodiment. In step 600, the computer implemented method providing an augmented reality (AR) function is started. In step 610, a user device is connected to at least one capturing device. In step 620, input information is received regarding a music track and an instrument. In step 630, attribute information of the music track is determined based on the received input information. In step 640, real time content of audiovisual (AV) input signals is received using at least one capturing device. In step 650, visual information corresponding to visual data of the real time content is generated, wherein the visual information corresponds to a view regarding at least one user limb and an instrument comprising a plurality of user operable elements. In step 660, augmented reality (AR) instruction information is generated based on the attribute information of the music track, the augmented reality (AR) instruction information comprising a plurality of layers. In step 670, augmented reality (AR) visual information is generated by applying the augmented reality (AR) instruction information to the visual information so that a first layer of the augmented reality (AR) instruction information is applied above at least a portion of the visual information. A second layer of the augmented reality (AR) instruction information may further be applied below at least a portion of the visual information. The method is ended in step 680.

Attribute information may comprise to mean data (e.g. the exercise data 530 in FIG. 5) that is displayed for the user, such as notes, intervals or chords, according to which the player plays the music track/exercise. However, the exercise data given to a more experienced user may be a name of a song in minimum. Exercise data is also used for comparing with the played signal in order to evaluate the playing of the user.

In an embodiment, input information regarding a music track and an instrument is received and attribute information for that particular music track and instrument is determined based on the received input information.

In an embodiment, the attribute information for the particular music track and instrument may comprise musical notation for the track and the instrument.

For example, a music track and a guitar is selected and accordingly guitar chords for the music track are determined.

In an embodiment, the attribute information for the particular music track and instrument may comprise operation instructions for a plurality of user operable elements of the instrument, such as keys, frets, strings or buttons. The operation instructions may be such that if the user follows the operation instructions for a plurality of user operable elements of the instrument, desired musical notation for the track and the instrument is achieved.

In an embodiment, input information may further comprise user level information. The user level information may be used to determine level of attribute information corresponding to the user level. Different levels may comprise, for example, name of the music track, tempo of the music track, musical notation of the music track, chords of the music track, and operation instructions for a plurality of user operable elements of the instrument for the music track, for example.

The hardware implementation of the apparatus or system may comprise different types of cameras, displays, and computing devices, e.g., an augmented reality (AR) helmet such as Hololens or a mobile phone, for example. A computer with a USB webcam may also be used.

Without in any way limiting the scope, interpretation, or application of the claims appearing below, a technical effect of one or more of the example embodiments disclosed herein is an improved system for music instrument 120 exercise for a music track playing.

Mounting the capturing element 160, such as a camera, on the instrument 120 provides multiple benefits.

First, it becomes technically feasible, at a low cost, to produce pixel-perfect computer vision analysis and image compositing even when the instrument 120 moves (i.e., players can live and feel the music with their bodies instead of staying stiff and still).

Second, the camera view is more natural and closer to realistic first person view than if the camera was placed, e.g., on top of a personal computer monitor. This is important, as it makes it more intuitive to move user's hands according to the visual instructions. To understand this, consider how difficult it is to cut one's own hair using a mirror; here, due to the 180-degree rotation of the visuals, one needs to remap movement directions when acting based on what one sees in the mirror.

Segmenting the image and compositing segments and visuals in layers provides the benefit of increased immersion and feel of the instructions being embedded in the real world instead of being simply overlaid on top of the camera view. As occlusion is one of the strongest 3D perception cues, the segmentation also helps to resolve visual ambiguities.

The visual design features provide the further technical effects.

FIGS. 7*a-f* show illustrative drawings showing operations in accordance with an aspect of the disclosed embodiments.

Figure 7A:
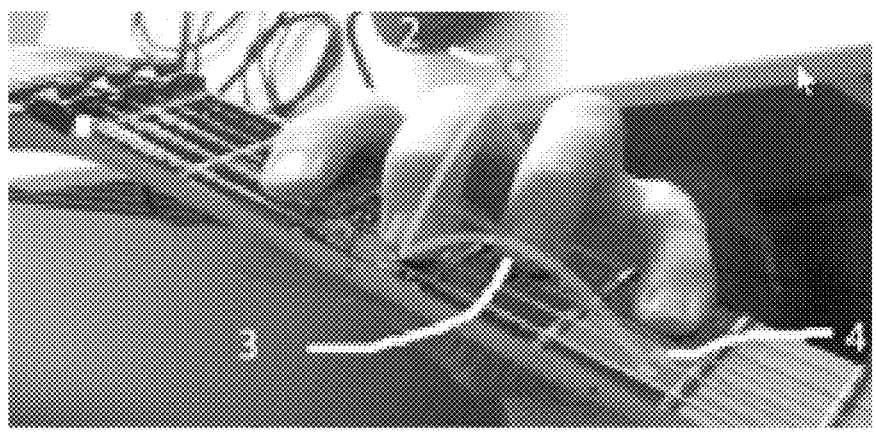
FIGS. 7a-f show illustrative drawings showing operations in accordance with an aspect of the disclosed embodiments.

FIG. 7*a* shows an example of composited instructions for generating augmented reality (AR) visual information by applying the augmented reality (AR) instruction information to the visual information so that a first layer of the augmented reality (AR) instruction information is applied above at least a portion of the visual information. A second layer of the augmented reality (AR) instruction information may be applied below at least a portion of the visual information.

For example, the first layer of the augmented reality (AR) instruction information comprises a bouncing ball (2) and a predictive trajectory (3), and the second layer of the augmented reality (AR) instruction information comprises predictive fretboard markers (4).

Figure 7B:

FIG. 7b shows an example of composited instructions for generating augmented reality (AR) visual information by applying the augmented reality (AR) instruction information to the visual information so that a first layer of the augmented reality (AR) instruction information is applied above at least a portion of the visual information. For example, the first layer of the augmented reality (AR) instruction information comprises correct hand pose visualized so that the user can match it. Visualized bone lengths etc. can be estimated from user's hand by using computer vision of the capturing device, for example.

Figure 7C:

FIG. 7c shows an example of composited instructions for generating augmented reality (AR) visual information by applying the augmented reality (AR) instruction information to the visual information so that a first layer of the augmented reality (AR) instruction information is applied above at least a portion of the visual information. For example, the first layer of the augmented reality (AR) instruction information comprises correct hand pose visualized so that the user can match it. Visualized bone lengths, or limb outlines etc. can be estimated from user's hand by using computer vision of the capturing device, for example.

Figure 7D:
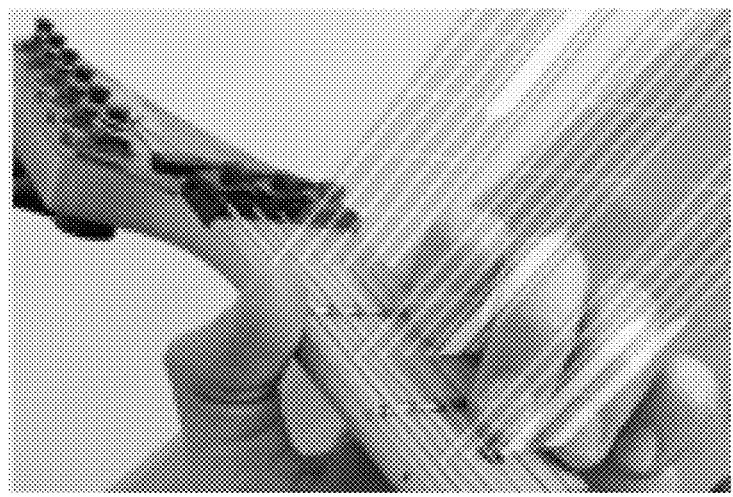

FIG. 7d shows an example of composited instructions for generating augmented reality (AR) visual information by applying the augmented reality (AR) instruction information to the visual information so that a first layer of the augmented reality (AR) instruction information is applied above at least a portion of the visual information. For example, the first layer of the augmented reality (AR) instruction information comprises timelines of notes for each fret position augmented on the guitar.

Figure 7E:
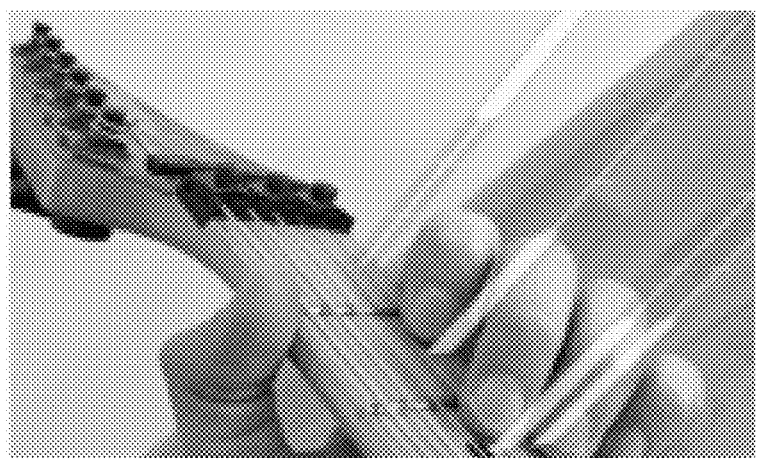

FIG. 7e shows an example of composited instructions for generating augmented reality (AR) visual information by applying the augmented reality (AR) instruction information to the visual information so that a first layer of the augmented reality (AR) instruction information is applied above at least a portion of the visual information. For example, the first layer of the augmented reality (AR) instruction information comprises timelines of notes for each string and fret position augmented on the guitar. Strings and frets with no upcoming notes are hidden to minimize clutter.

Figure 7F:
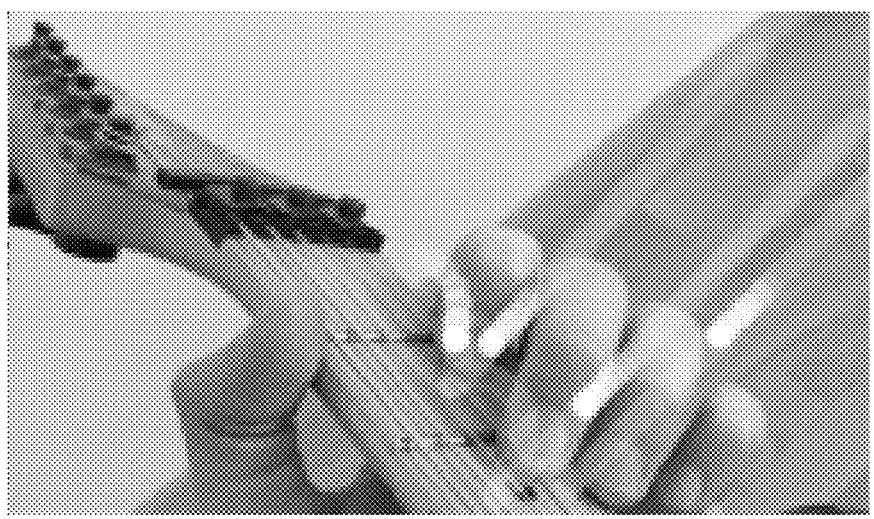

FIG. 7f shows an example of composited instructions for generating augmented reality (AR) visual information by applying the augmented reality (AR) instruction information to the visual information so that a first layer of the augmented reality (AR) instruction information is applied above at least a portion of the visual information. For example, the first layer of the augmented reality (AR) instruction information comprises linear per fret and string timelines combined with a bouncing ball. Target is to hit linearly moving notes when they collide with the bouncing ball.

A technical effect of one or more of the example embodiments disclosed herein is that compared to simply highlighting where to press with a visual marker, the bouncing ball offers more precise anticipation of when to press (i.e., when the ball bounces off the fretboard, for example). There are at least two reasons for this. First, the human visual system is accustomed to predicting physically based movement in our surroundings. Second, our visual attention is better held by curved than straight movement, a phenomenon utilized by stage magicians, for example.

A further technical effect of one or more of the example embodiments disclosed herein is that compared to prior known flying notes, the predictive trajectory guides more effectively the user's visual attention between the notes. Without the trajectory, it is easy to miss notes that are spatially distant from each other.

Another technical effect of one or more of the example embodiments disclosed herein is an improved music instrument exercise system. Another technical effect of one or more of the example embodiments disclosed herein is improved mixing of a plurality of AV streams. Another technical effect of one or more of the example embodiments disclosed herein is arranging an AR function service with an external capturing device. Another technical effect of one or more of the example embodiments disclosed herein is the provision of a simplified and reliable system for providing an augmented reality (AR) function for music instrument exercise associating a user device and a capturing device with generating augmented reality (AR) visual information by applying augmented reality (AR) instruction information to the visual information so that a first layer of the augmented reality (AR) instruction information is applied above at least a portion of the visual information. A second layer of the augmented reality (AR) instruction information may further be applied below at least a portion of the visual information.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications that may be made without departing from the scope of the present invention as defined in the appended claims.

The invention claimed is:

1. A computer implemented method for providing an augmented reality (AR) function, comprising:
   receiving input information of a music track and an instrument;
   determining attribute information of the music track based on the received input information, the attribute information comprising data for a user to play the music track with the instrument;
   receiving real time content of audiovisual (AV) input signals using at least one capturing device;
   the real time content comprising visual information that corresponds to a view regarding at least one user limb and the instrument comprising a plurality of user operable elements;
   generating augmented reality (AR) instruction information based on the attribute information of the music track, the augmented reality (AR) instruction information comprising a plurality of layers;
   generating augmented reality (AR) visual information by applying the augmented reality (AR) instruction information to the visual information so that a first layer of the augmented reality (AR) instruction information is applied above at least a portion of the visual information; and
   causing a display of the generated augmented reality visual information.

2. The method of claim 1, further comprising:
generating the augmented reality (AR) visual information by mixing the augmented reality (AR) instruction information with the visual information by a mixer application;
encoding the augmented reality (AR) visual information by the mixer application; and
providing the encoded augmented reality (AR) visual information by the mixer application to a user interface of a user device.

3. The method of claim 1, further comprising:
receiving instrument selection information;
receiving track selection information; and
determining the input information of the music track and the instrument based on the instrument selection information and the track selection information.

4. The method of claim 3, further comprising:
segmenting the visual information to generate a plurality of data segments within the visual information, wherein the plurality of data segments comprises at least a user data segment and an instrument data segment.

5. The method of claim 4, wherein the user data segment comprises information of a user limb used to play the instrument.

6. The method of claim 5, wherein the user data segment comprises information of a position or an orientation of the user limb.

7. The method of claim 4, wherein the instrument data segment comprises information of the at least one of the plurality of user operable elements of the instrument.

8. The method of claim 7, wherein the instrument data segment comprises information of a position or an orientation of the at least one of the plurality of user operable elements.

9. The method of claim 7, wherein the at least one of the plurality of user operable elements comprises at least one of the following:
a fret;
a string;
a key; and
a button.

10. The method of claim 4, wherein a second layer of the augmented reality (AR) instruction information is applied below the user data segment and above the instrument data segment.

11. The method of claim 4, wherein a second layer of the augmented reality (AR) instruction information is applied below the user data segment and below the instrument data segment.

12. The method of claim 4, comprising: generating the augmented reality (AR) visual information by applying the augmented reality (AR) instruction information to the visual information so that a third layer of the augmented reality (AR) instruction information is applied below a second layer of the augmented reality (AR) instruction information.

13. The method of claim 12, wherein the second layer of the augmented reality (AR) instruction information is applied below a first instrument data segment and above a second instrument data segment, and the third layer of the augmented reality (AR) instruction information is applied below the second instrument data segment.

14. The method of claim 1, further comprising performing distance-based segmentation using a depth camera.

15. The method of claim 14, further comprising:
determining 3D space information of the instrument based on captured real time content; and
adjusting the augmented reality (AR) instruction information based on the 3D space information so that the augmented reality (AR) instruction information changes according to changes in position or orientation of the instrument.

16. The method of claim 15 wherein the method further comprises:
segmenting the visual information to generate a plurality of data segments within the visual information, wherein the plurality of data segments comprises at least a user data segment and an instrument data segment; and
the first layer of the augmented reality instruction information is applied above the user data segment and the instrument data segment.

17. An apparatus for providing an augmented reality (AR) function, comprising:
a communication interface;
a user interface;
at least one capturing device;
at least one processor; and
at least one memory including computer program code;
the at least one memory and the computer program code configured to, with the at least one processor, cause the apparatus to:
receive input information regarding a music track and an instrument;
determine attribute information of the music track based on the received input information, the attribute information comprising data for a user to play the music track with the instrument;
receive real time content of audiovisual (AV) input signals using the at least one capturing device;
the real time content comprising visual information that corresponds to a view regarding at least one user limb and the instrument comprising a plurality of user operable elements;
generate augmented reality (AR) instruction information based on the attribute information of the music track, the augmented reality (AR) instruction information comprising a plurality of layers;
generate augmented reality (AR) visual information by applying the augmented reality (AR) instruction information to the visual information so that a first layer of the augmented reality (AR) instruction information is applied above at least a portion of the visual information; and
cause a display of the generated augmented reality visual information.

18. The apparatus of claim 17, wherein:
the apparatus further comprises a depth camera;
the at least one capturing device comprises a camera directed at the instrument and at least one of the following: the instrument, and a microphone; and
the at least one memory and the computer program code configured to, with the at least one processor, cause the apparatus to:
perform distance-based segmentation using the depth camera.

19. The apparatus of claim 18, wherein the camera is attached to the instrument so that the camera is configured to capture the real time content of the view regarding the at least one user limb and at least one of the plurality of user operable elements of the instrument.

20. A computer program embodied on a computer readable non-transitory medium comprising computer executable program code, which when executed by at least one processor of a master device, causes an apparatus to:

receive input information of a music track and an instrument;

determine attribute information of the music track based on the received input information, the attribute information comprising data for a user to play the music track with the instrument;

receive real time content of audiovisual (AV) input signals using at least one capturing device;

the real time content comprising the visual information that corresponds to a view regarding at least one user limb and the instrument comprising a plurality of user operable elements;

generate augmented reality (AR) instruction information based on the attribute information of the music track, the augmented reality (AR) instruction information comprising a plurality of layers;

generate augmented reality (AR) visual information by applying the augmented reality (AR) instruction information to the visual information so that a first layer of the augmented reality (AR) instruction information is applied above at least a portion of the visual information; and causing a display of the generated augmented reality visual information.

* * * * *